Figure 1:
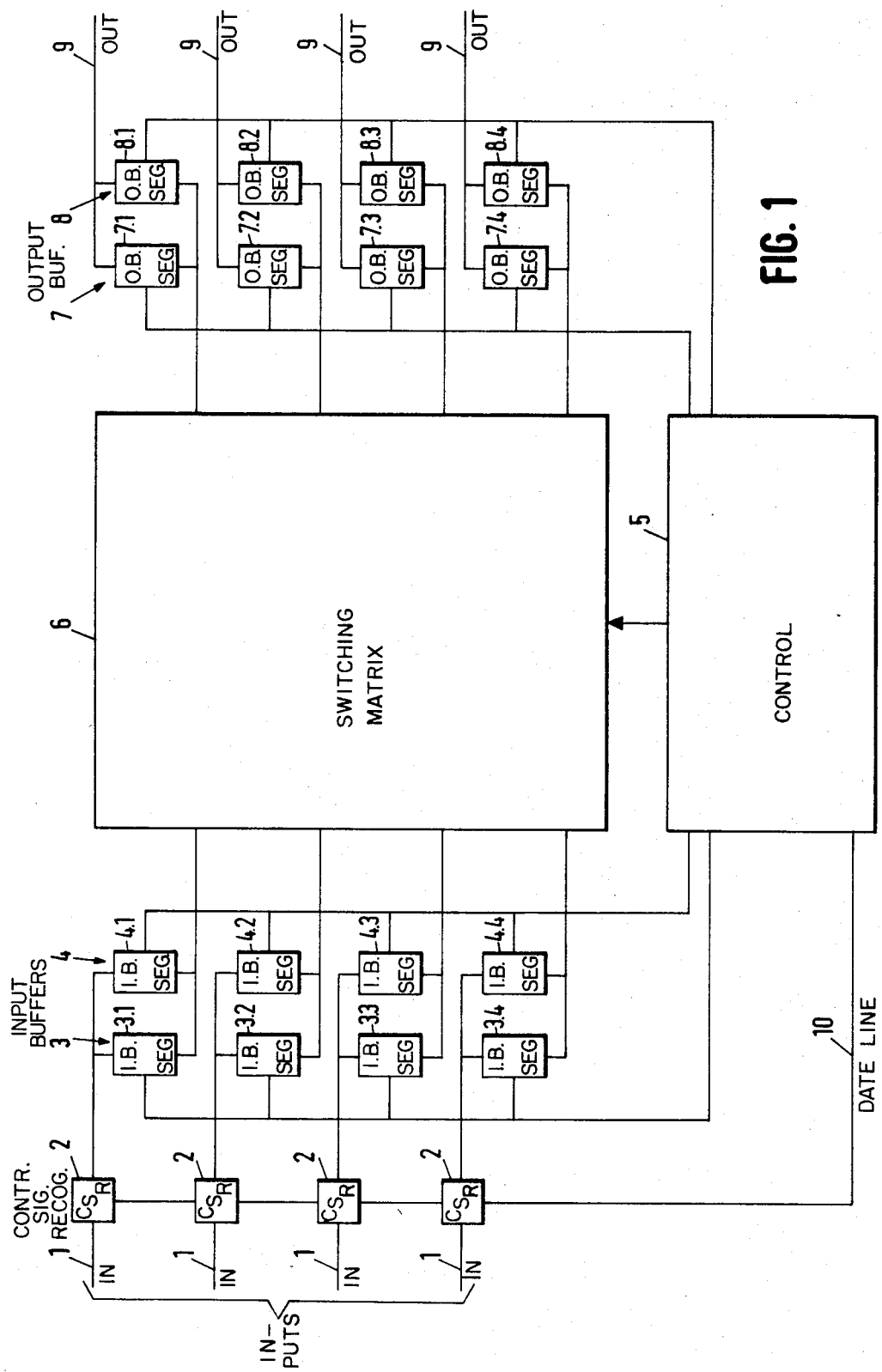

United States Patent [19]

Wilcke

[11] Patent Number: 4,495,615
[45] Date of Patent: Jan. 22, 1985

[54] METHOD AND DEVICE FOR CONTROLLING A SWITCHING NETWORK

[75] Inventor: Robert Wilcke, Leiden, Netherlands

[73] Assignee: Statt der Nederlanden (Stattsbedrijf der Posterijen, Telegrafie en Telefonie), The Hague, Netherlands

[21] Appl. No.: 416,347

[22] Filed: Sep. 9, 1982

[30] Foreign Application Priority Data

Sep. 22, 1981 [NL] Netherlands ............ 8104358

[51] Int. Cl.$^3$ .......................................... H04Q 11/04
[52] U.S. Cl. ............................................ 370/58; 370/54
[58] Field of Search ............... 370/58, 63, 64, 54

[56] References Cited

U.S. PATENT DOCUMENTS

| | | | |
|---|---|---|---|
| 3,761,619 | 9/1973 | Pommerening | 370/58 |
| 4,114,143 | 9/1978 | Karnaugh | 370/63 |
| 4,198,546 | 4/1980 | Schlichte | 370/58 |
| 4,317,193 | 2/1982 | Joel | 370/58 |
| 4,456,987 | 6/1984 | Wirsing | 370/58 |

FOREIGN PATENT DOCUMENTS 2222727  3/1973  France .

OTHER PUBLICATIONS

Opferman, D. C. and Tsao-Wu, N. T.; "On a Class of Rearrangeable Switching Networks—Part I: Control Algorithm," The Bell System Technical Journal, vol. 50, No. 5, May–Jun. 1971, pp. 1578–1600.

Opferman, D. C. and Tsao-Wu, N. T.; "On a Class of Rearrangeable Switching Networks—Part II: Enumeration Studies and Fault Diagnosis," The Bell System Technical Journal, vol. 50, No. 5, May–Jun., 1971, pp. 1601–1618.

Philip, A. S., "The System X Digital Switching Subsystem (DSS)," Plessey Telecommunications Systems, Poole, pp. 5–19.

Alles, H. G., "An Intelligent Network Processor for a Digital Central Office," Bell Laboratories, Murray Hill, NJ 07974.

Rose, D. J., "PCM Tandem Switching Field Trial in the U.K.," Standard Telephones and Cables Limited. Institute of Electrical and Electronics Engineers. International Switching Symposium Record, Cambridge, MA, Jun. 6–9, 1972.

McAuliffe, D. J. and Hagstrom, K. L., "Microprocessor Applications in Communications Switching," 1976 National Telecommunications Conference, Nov. 29–30 and Dec. 1, 1976, Dallas, TX.

Telefonaktiebolaget LM Ericsson, "SPC Switching System for Local Transit and Combined Telephone Exchanges Axe 10—System Survey," Stockholm, Sweden.

Primary Examiner—Douglas W. Olms
Attorney, Agent, or Firm—Frishauf, Holtz, Goodman & Woodward

[57] ABSTRACT

Method and device for controlling a TST-switching network. The control device (5) controls the network in such a way that in one frame period in each of the λ internal time slots the (n x n)-switching matrix (6) is set according to the switching pattern of an (n x n)-permutation matrix, so that in each time slot always n switching paths between the input buffer (3 or 4) and the output buffer (7 or 8) are set up in parallel. Consequently, the network is free from blockings for at most n x λ switching paths.

8 Claims, 8 Drawing Figures

METHOD AND DEVICE FOR CONTROLLING A SWITCHING NETWORK

The invention relates to a method and a device for controlling a switching network, which network comprises:

A. an input buffer, consisting of a number of input buffer segments for storing incoming signals to be switched through;

B. an output buffer, consisting of an equal number of output buffer segments for recording signals switched through;

C. a switching matrix via which switching paths are formed between the input buffer and the output buffer; and D. a control device for periodically establishing switching paths, each of these switching paths being always set up once in a fixed period, the frame period, which is divided into a number of internal time slots, in which one or more switching paths can be realized at a time.

Similar methods and devices for switching networks as mentioned above are generally known and are utilized in e.g. telecommunication exchanges, as appears from AXE-10 System Survey, L. M. Ericsson doc. 118 708 Ue.

Said known control devices comprise a cyclic store for indicating the signal positions in the input buffer and output buffer segments, and for setting the switching matrix points, the addresses of which positions and points are recorded in a route store, which forms also part of said cyclic store. Moreover, said devices comprise a central store, containing a mirror administration of the route store, means for preparing the necessary modifications in the mirror administration of the route store in the case of mutations in the origin and destination of the signal, so in the case of mutations in the connection interest, and besides they comprise means for transferring said modifications to the route store at the proper moments. For making the modifications for a new switching path to be set up the mirror administration has to be searched for a free internal time slot for such a switching path.

Owing to the fact that a switching matrix is used for simultaneously establishing a number of switching paths within such an internal time slot—the utilization being restricted because each column and each row of the switching matrix may be used only once at a time—such a time slot cannot always be found, so that an internal blocking may occur. Sometimes rearrangement methods, in which existing connections between two or more internal time slots are exchanged, are then employed, so that usually the connection asked for can be established anyhow. The blocking chance, however, remains greater than zero, and special measures have to be taken to prevent so-called data slip.

There are a plurality of known suggestions to solve the blocking problem, but all of them only lead to an approximately blocking-free device, and if it is indeed blocking free, such a device is less attractive from an economical point of view.

The object of the present invention is to provide a method and a device of the kind described above and allowing the blocking-free switching in a simple and economical way, also with regard to very large switching networks. To realize this object the method according to the invention is characterized in that the control device sets the switching matrix during each internal time slot according to one of a number of fixed patterns, in such a way that each of the rows is through-connected with a different column of the switching matrix.

An interest matrix is defined by the numbers which each indicate the number of signals that have to be switched through from a certain input buffer segment to destinations in a certain output buffer segment, which numbers are, consequently, a measure for the connection interest between the input buffer and the output buffer segments. As the number of input buffer segments is equal to the number of output buffer segments, said interest matrix is a square matrix.

A switching matrix is called fully occupied when during each frame period in each time slot always the maximum number of signals is switched through. If in none of the input buffer segments and in none of the output buffer segments the number of signal stores exceeds the number of internal time slots, then the use of a permanently fully occupied switching matrix causes the switching network to become blocking-free, which is taken as a starting-point for the method according to the present invention. If the number of signal stores is equal in all the input buffer segments and also equal to the number of internal time slots, and if the switching matrix is fully occupied, then the interest matrix is called fully occupied.

The method according to the invention preferably comprises the following stages:

from the signalling data of a telecommunication signal are derived an input address with an input number, which indicates the position in the input buffer segment with that input number, and an output address with an output number, which indicates the position in the output buffer segment with that output number;

from the input and output numbers thus obtained a (connection) interest matrix is calculated;

from this interest matrix a series of permutation matrices is calculated, the sum of which comprises at least the interest matrix, which permutation matrices determine the switching patterns, according to which the switching matrix has to be set, the number of times a cross point of the switching matrix is used amounting to at most the number of internal time slots in each frame period;

the data for setting each of the switching patterns are recorded in one of a number of route stores;

controlled by the route store thus filled, switching paths are successively set up according to each of the predetermined switching patterns during each frame period.

Because of the fact that fixed patterns in the switching matrix are made use of, an absolutely blocking-free device is obtained, providing that the maximum number of switching paths possible at a time is always established, although it is not necessary really to use each switching path established for data transmission, as will be elucidated hereinafter.

The invention is based on the idea that a fully occupied switching matrix, each cross point of which has to be used a number of times within a frame period, can be set according to a number of switching patterns in the consecutive internal time slots, in such a way that within each switching pattern each column as well as each row are used exactly once, and that a pattern will be set so many times till each of the switching paths is established.

Besides, the number of times the cross points in each row or column are used within said frame period will always be at most the number of internal time slots occurring in a frame period.

The device according to the invention is characterized by a store for recording the signalling data, a microprocessor circuit for calculating the interest matrix and the permutation matrices, a route store for recording the data from the switching patterns and for establishing, under the control of these data, switching paths between the input buffer and the output buffer segments via the switching matrix according to said switching patterns.

Another characteristic of the device according to the invention consists in that the number of internal time slots is at least equal to the number of signal stores of the largest of the input segments in the input buffer. This is known per se in switching networks in which a large number of external circuits can be switched through. For small numbers of external circuits, however, the number of internal time slots in existing switching networks is always chosen much larger in order to reduce the blocking chances.

When employing the method according to the invention in known switching networks, however, there are another two ways in which data slip can be introduced, to wit, when the passage through the internal time slots is not correctly attuned to the external time slot organization, and when the modifications caused by changes in the connection interest are not recorded in the route store at the right moment and not quickly enough. In order to prevent these two forms of data slip, measures as described hereinafter have to be taken.

Both the input buffer and the output buffer in the switching network to which the control according to the invention relates are preferably designed in twin form, and the control device according to the invention preferably comprises first switching means to exchange the functions of the two input buffers and the functions of the two output buffers periodically, in such a way that the recording of the signals in one of the input buffers, the reading of the switched-through signals in one of the output buffers, and the switching-through to the other output buffer of the signals recorded in the other input buffer during the preceding frame period, can take place in parallel. This is known in itself as appears from A. S. Philip: The System X digital switching subsystem (DSS), "Systems Technology", September 1979 no. 32. Said procedure is used in this System X only to get around difficulties with access times. In the present invention, however, it has—apart from the advantage that data slip is prevented—also the advantage of a complete disconnection from the environment for the sake of the switching-through process, so that the internal time slots are all equivalent and it therefore does not make any difference in which of the internal time slots a signal is switched through. Said disconnection also benefits the method according to the invention because of the fact that this method implicitly comprises a form of rearrangement, allowing the possibility of exchanging signals between at most two internal time slots. All this will be clear from the description of the figures.

The above-mentioned data-slip problems, which may occur when changes in the route store are not made in good time, can be prevented when such changes are made for example at the beginning of a new frame period and have been made when the switching-through of signals begins in the first time slot of the new frame period. For this purpose the device according to the invention has preferably been provided with a route store designed in twin form, and preferably comprises second switching means in order to exchange the functions of the two route stores after a whole number of frame periods at the beginning of a new frame period, so that when one of the route stores is actually being used as a route store for switching-through signals, the other one is permanently available for making modifications caused by changes in the connection interest.

The method and device as described above provide in a relatively simple way a solution to the problem of blocking-free switching of connections in for example telephone exchanges working on a time-division basis.

Figure 2:
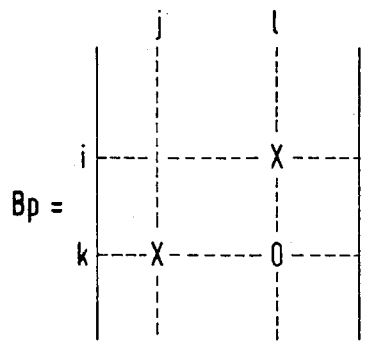
Figure 3:
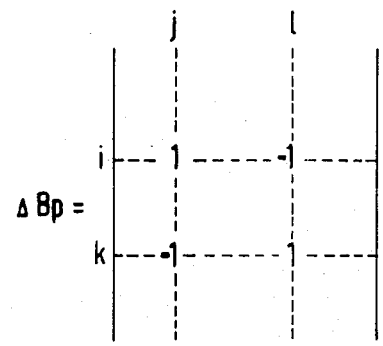
Figure 4:
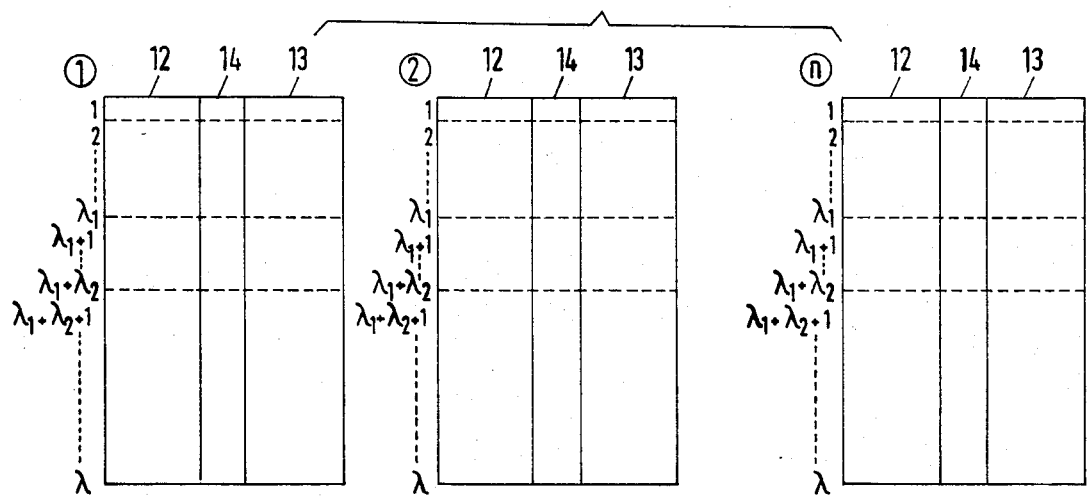
Figure 5:
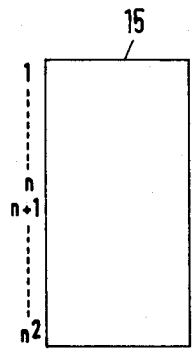
Figure 6:
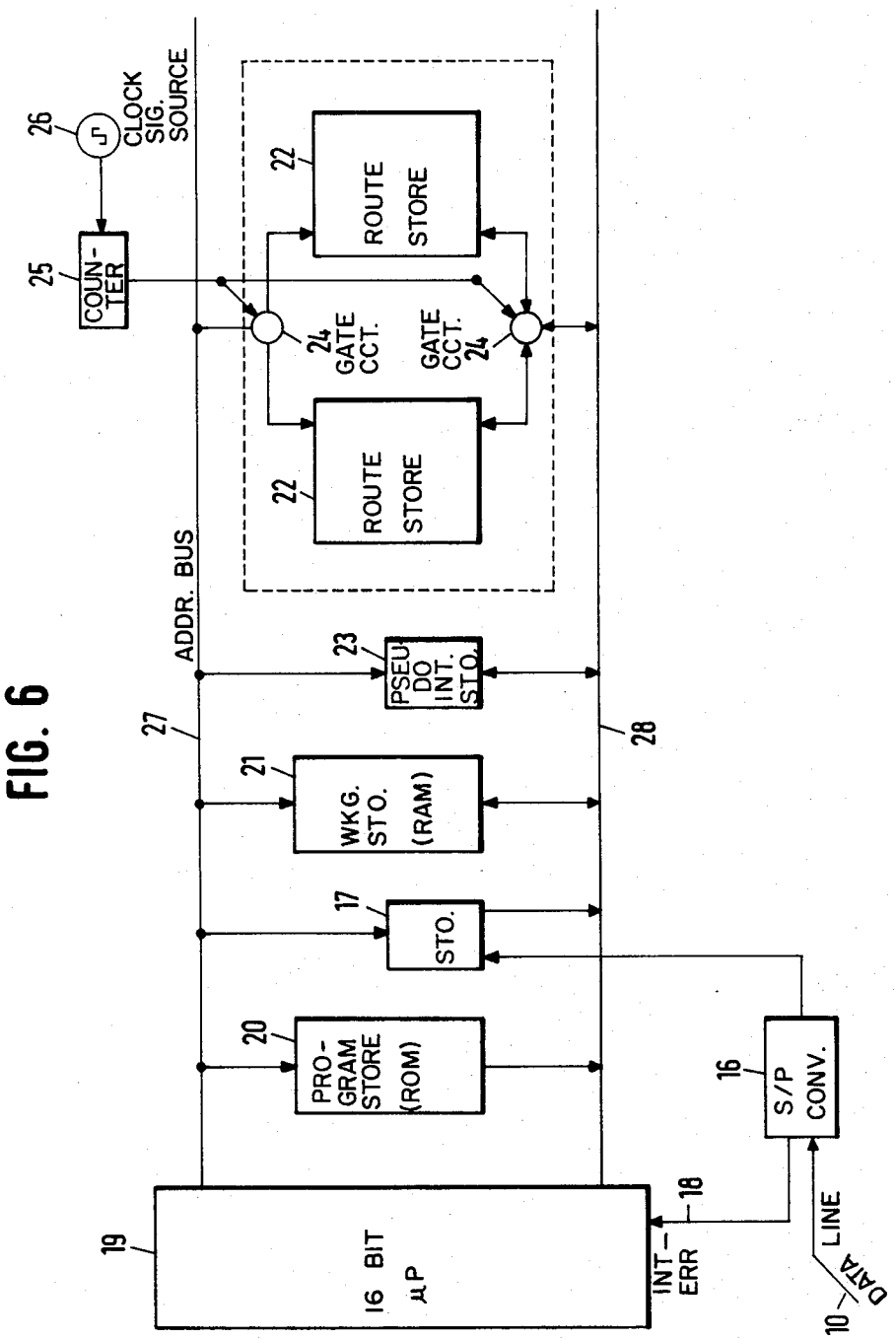
Figure 7:
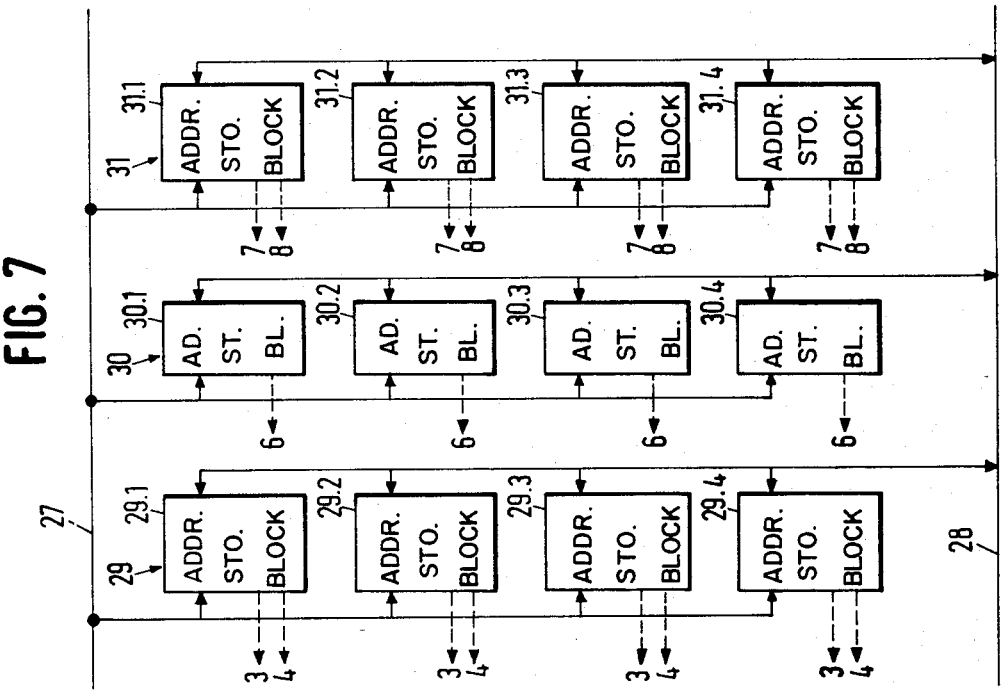

The invention will be elucidated hereinafter with the help of the drawing, in which FIG. 1 shows a block diagram, representing the construction of a switching device working on a time-division basis;

FIG. 2 a special pseudo-interest matrix;

FIG. 3 a modification of the matrix according to FIG. 2;

FIG. 4 a table structure for storing traffic interest data;

FIG. 5 a table for the pseudo-interest matrix Bp;

FIG. 6 an elaboration of the control device 5 as shown in FIG. 1;

FIG. 7 an elaboration of one of the route stores 22 shown in FIG. 6, and

Figure 8:
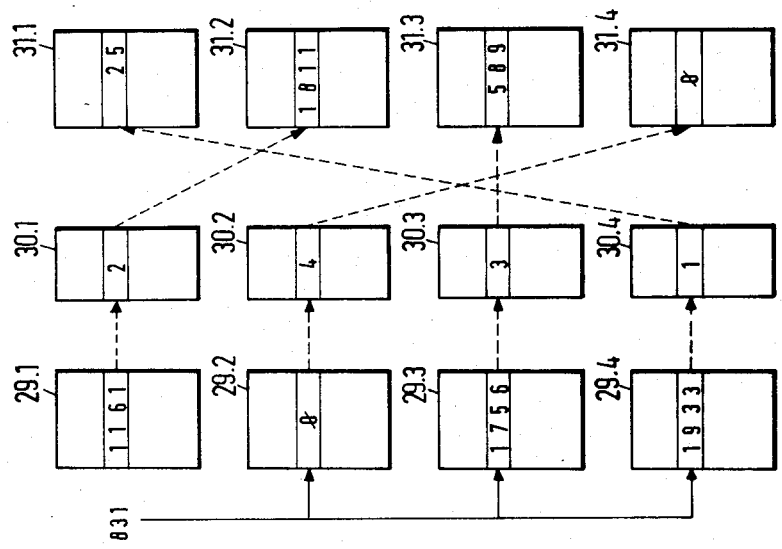

FIG. 8 the address storage blocks of one of the two route stores 22 in which possible addressing contents of a type slot are represented by way of example.

FIG. 1 shows a possible block diagram of a switching network working on a time-division basis. The incoming signals multiplexed on a time-division basis are supplied via the inputs 1 to the control-signal recognition devices 2, which recognize the signalling data comprising the origin and the destination of the traffic signals. The working of signal recognition devices is generally known and, consequently, need not be further explained. Although it is of no importance for the explanation of the invention, it is remarked that also a separate channel can be used for signalling.

The incoming signals are supplied in a known way to an input circuit comprising two input buffers 3 and 4, each having four equal input buffer segments 3.1 to 3.4 and 4.1 to 4.4 in this embodiment. The positions for the signals in said input buffers are indicated sequentially at the rhythm of a central clock, which is not shown in detail in the figure. As soon as the input buffer 3 is filled, the next signals will be supplied to the input buffer 4 under the control of a pulse derived from the central clock, which pulse limits the aforesaid frame period, and via gate circuits which are not shown in detail in the figure either, and the reading of the signals in the input buffer 3 is immediately started for the sake of switching through. In this way the input buffers 3 and 4 are alternately filled and read. The reading, which also occurs at the rhythm of the central clock, takes place consecutively according to a sequence indicated by a control device 5, from which, also at the same time, a switching matrix 6 is set and the destinations of the signals are indicated in one of the output buffers 7 or 8 to which the signals are switched through and which belong to an output circuit. Like the input buffers the output buffers 7 and 8 also comprise equal output buffer segments 7.1 to 7.4 and 8.1 to 8.4. If the output buffer 7 is filled in the said way, the same pulse that effected the exchange of functions of the input buffers 3 and 4 will cause the output buffers 7 and 8 to change functions, i.e. the output buffer segments 8.1 to 8.4 will then be filled and the output buffer segments 7.1 to 7.4 will be read sequentially in parallel for each output 9.

The way in which the control device 5 controls the switching-through is of common knowledge and, consequently, need not be further explained. The sequence in which the control device 5 carries out the switching-through is characterizing for the invention and will be described hereinafter.

The signalling data from which it can be derived to which position in the output buffer 7 or 8 the signals in the input buffer 3 or 4 have to be switched through, can be supplied to the control device 5 by for example the control-signal recognition device 2 via a data line 10. Said signalling data comprise e.g. two numbers of external circuits, notably the number of the external circuit from which the signal had come before it was applied in a multiplexed form to one of the inputs 1, and the number of the external circuit for which the signal is destined, beyond the output 9 after a demultiplex processing. In the embodiment it is taken into account that at each input 1 signals from 2000 different circuits can enter in a multiplexed form every time within one frame period, so they can come from a total of 8000 circuits numbered from 1 to 8000, and that the destination of each signal is always one of the 8000 target external circuits, also numbered from 1 to 8000, which are always accessible per 2000 via one of the multiplex outputs 9. In the embodiment the extent $\lambda$ of the input buffer and the output buffer segments in the input and in the output circuit has been chosen equal to the number of multiplexed circuits of each input 1, so $\lambda=2000$. For each input 1 the number of multiplexed circuits may generally be $\leq \lambda$. So for each signal connection the signalling data can consist of two 13-bit words, indicating the circuit numbers of the input circuit and of the destination circuit, to which 1 bit, indicating whether this connection has to be set up or cleared, is added. If for a signal connection which has to be set up these circuit numbers are e.g. 3198 and 7861, respectively, the control device 5 derives from this datum that during a certain holding time the signals in storage position 1198 in the second input buffer segment of input buffer 3 or 4 have to be recorded, via switching matrix point (2,4), in storage position 1861 in the fourth output buffer segment of the output buffer 7 or 8.

Signalling data will only come in via data line 10 in case a change takes place in the connection interest, i.e. when a connection has to be set up or cleared.

The numbers of signals which, at a given moment, have to be switched through within a frame period via a predetermined switching matrix point, thus from a predetermined input buffer segment to a predetermined output buffer segment, are called interest numbers, and determine the row and column elements of a square matrix, the interest matrix.

In case the input buffer 3 or 4 is fully occupied with signals, one speaks of a fully occupied interest matrix. Such a fully occupied interest matrix has the property that the sum of the matrix elements of each row is equal to the sum of the matrix elements of each column, i.e. equal to the number $\lambda$, which indicates the size of the input buffer and output buffer segments chosen.

From matrix-calculation a theorem (König's theorem) is known, according to which (n x n)-matrices A with the above-mentioned property can be written as follows:

$$A = \sum_k \lambda_k P_k \qquad (I)$$

that is that A can be written as a development in (n x n)-permutation matrices $P_k$ under the normal matrix addition, here indicated by $\Sigma$. In this development no more than min $(n^2-n, \lambda)$ different permutation matrices $P_k$ occur, and they form a subset of the set of all the n! (n x n)-permutation matrices. The development coefficient $\lambda_k$ indicates the number of times the permutation matrix $P_k$ occurs in the development. The permutation matrices too have the above-mentioned property, with the special feature that each matrix column and each matrix row contains exactly one matrix element equal to 1, and that the other elements are equal to 0. This special feature now means that these permutation matrices $P_k$ correspond with the switching patterns referred to above in a one-one way, every time allowing the switching-through of n signals at a time.

Further, in the development (I) of the fully occupied interest matrix A it obtains that:

$$\sum_k \lambda_k = \lambda \qquad (II)$$

This means that when utilizing the method according to the invention, always n x $\lambda$ signals can be switched through in $\lambda$ access-cycles, an access-cycle indicating the period of time in which n signals can be switched through at a time according to a switching pattern prescribed by a permutation matrix occurring in the matrix development, that is the period of time of one time slot. For $\lambda=2000$ this switching-through is amply feasible within the frame period of 125 $\mu$s usual in TDM-techniques.

Usually the instantaneous interest matrix B is not fully occupied. Possibilities of establishing connections which are not made use of at a certain moment, are called pseudo-connections. The numbers indicating how many pseudo-connections there can be established at a certain moment between buffer blocks at the input side and buffer blocks at the output side, in such a way that these numbers added up to the numbers of the actual interest between said buffer blocks in the matrix B result in a quasi fully occupied interest matrix A, form a pseudo-interest matrix Bp, the matrix elements of which indicate the so-called pseudo-interest numbers. So this pseudo-interest matrix is a representation of the unoccupied switching paths through the connection system. Consequently:

$$A = B + Bp \qquad (III)$$

A again has a development as indicated in (I).

The connection interest changing in the course of time presents itself in the following cases:
1. a real signal connection is cleared. This connection is made a pseudo-connection by decreasing the interest number in the matrix B, which number corresponds with the former connection, by 1 and by increasing the corresponding pseudo-interest number in the matrix Bp by 1. In this case the instantaneous development in the permutation matrices of the matrix A does not undergo a change;

2. a new signal connection has to be established. Two cases can be distinguished:

2.1 the pseudo-interest number belonging to the connection to be established is larger than zero. The real connection is established by decreasing this pseudo-interest number in the matrix Bp by 1 and by increasing the interest number in the matrix B, which number corresponds with said pseudo-connection, by 1. In this case too the instantaneous development in the permutation matrices of the matrix A does not undergo a change;

2.2 the pseudo-interest number belonging to the connection to be established is equal to zero. This pseudo-interest number can be found for example in position (k, 1) in the pseudo-interest matrix Bp. This situation is shown in FIG. 2. Because of the fact that the connection can be established, there is in row k as well as in column 1, in which the pseudo-interest number occurs in the pseudo-interest matrix Bp, at least one other pseudo-interest number larger than zero. These other pseudo-interest numbers, which can be found for example in the positions (k, j) and (i, 1) in the matrix Bp, are designated by X in FIG. 2. A modification matrix $\Delta Bp$, represented in FIG. 3, is thus formed that it has matrix elements unequal to zero only in the positions indicated. A new pseudo-interest matrix Bp' is obtained by:

$$Bp' = Bp + \Delta Bp \qquad (IV)$$

A new quasi fully occupied interest matrix A' results from:

$$\begin{aligned} A' &= B + Bp' \\ &= A + \Delta Bp \end{aligned} \right\} \qquad (V)$$

As A' also has the above property, there is for A' also a development in permutation matrices of the form (I). This development has only a small deviation from the permutation matrix development belonging to A, because always at most two permutation matrices have to be replaced by two other permutation matrices. Now the pseudointerest number in position (k, 1) in the new pseudo-interest matrix Bp' is larger than zero, which shows that the situation has become the same as the situation described above in case 2.1, be it that the development in the permutation matrices of the matrix A' has changed.

In an initial situation, when there is no traffic interest, and, consequently, $$A = Bp \qquad (VI)$$

one can start from a permutation matrix development belonging to A, which development corresponds with e.g. an average connection interest.

FIG. 4 shows the table structure for the storage of the traffic interest data. This structure consists of n tables, one for each of the n rows of the switching matrix. Each of the n tables comprises $\lambda$ records. Each record consists of three fields, two fields of which, 12 and 13, which are of a size, can comprise the addresses, respectively of a signal in the input buffer segment in the input buffer 3 or 4 at the input side, which input buffer segment corresponds with the number of the table, and of the destination of that signal in the output buffer segment of the output buffer 7 or 8 at the output side, of which output buffer segment a third field 14 comprises the number, which in fact also indicates a column number of the switching matrix. The n records, which can be found in corresponding positions in said n tables, belong to the same time slot. Within one time slot said column numbers together with their appurtenant table numbers form a representation of a permutation matrix $P_k$, as can be found in the development (I). In this way each permutation matrix $P_k$ in that development occurs $\lambda_k$ times in said tables. In the aforesaid initial situation (VI) the address fields 12 and 13 have not been filled in, in contradistinction to the fields 14, which have been filled in such a way that the column numbers belonging to the permutation matrix $P_1$, can always be found in the first $\lambda_1$ time slots, the column numbers belonging to the permutation matrix $P_2$ in the next $\lambda_2$ time slots, and so forth, so that all the $\lambda$ time slots are provided with such initial values. In fact the contents of the n tables form the proper routing data, which are used when the signals from the input buffers 3 or 4 are switched through to the output buffers 7 or 8.

FIG. 5 shows the table for the pseudo-interest matrix Bp, in which the $n^2$ matrix elements of the pseudo-interest matrix Bp are stored, for example in the first n positions the elements of the first row, in the second n positions the elements of the second row, and so forth. The matrix elements belonging to the same column are in this table always at a distance of n positions between them. In the initial situation this matrix Bp consists of elements derived from the numbers of the aforesaid average connection interest, which numbers have been increased in such a way that matrix Bp meets said property, that is that the sum of the elements of each row is equal to the sum of the elements of each column, to wit equal to $\lambda$.

In the further course of this description it will be clear that when using the tables shown in FIGS. 4 and 5, a further use of the matrices A and B introduced when explaining the mathematical background, will not be necessary. These matrices have been implicitly introduced into the tables of FIG. 4.

FIG. 6 shows a block diagram of the control device 5. The signalling data are supplied via a data line 10 to a series parallel converter 16, which converts the data into two 16-bit words, puts them in a store 17, and applies an interrupt signal to an interrupt input 18 of a 16-bit microprocessor 19. The microprocessor interrupts its working process and starts an interrupt program, which is stored in a program store 20, a 16-bit ROM, and which reads the store 17 and puts the contents in the appropriate store room in a working store 21, a 16-bit RAM. Next the microprocessor resumes its interrupted working process, which comprises for example the processing of signalling data already received, and for which the processing software is also stored in the program store 20. The signalling data, which are in fact connection mutation data and relate to the above-mentioned three cases of changing connection interest, are used to modify the tables indicated in FIGS. 4 and 5. These tables are respectively stored in two identical route stores 22 and in a pseudo-interest store 23. The stores 22 and 23 also consist of 16-bit RAMs. During a period of 10 msec, the mutation processing period, the two route stores 22 are alternately accessible for the microprocessor 19 for making modifications in the routing data on the basis of the signalling data received. The route store, which is not accessible for the microprocessor 19 during said period, supplies in that time the routing data for the switching-through of signals. The exchange of the functions of the two route stores 22 is carried out by gate circuits 24 on receipt of a switching pulse, which is derived by a counting mechanism 25 from a clock signal 26, which comes from the central clock already mentioned and always indicates the beginning of a new mutation processing period. The gate circuits 24, which do not form part of the invention, are carried out according to known techniques and are therefore not described in detail.

All the said stores 17, 20, 21, 22 and 23 are accessible for the microprocessor 19 via an address bus 27 and a data bus 28.

FIG. 7 shows in a block diagram one of the two route stores 22 in more detail. Such a route store consists of three address stores 29, 30 and 31. Each address store has the same number of address positions as an input buffer 3 or 4, which number is also equal to the number of signal storage positions an output buffer 7 or 8 has. For $n=4$ and $\lambda=2000$ these address stores each consist of four address storage blocks 29.1-29.4, 30.1-30.4 and 31.1-31.4, for which 16-bit RAMs with 2000 storage positions have been chosen.

The address store 29 contains the addresses which refer to the signal storage positions in one of the input buffers 3 or 4, in such a way that the first address storage block 29.1 contains only the addresses which refer to the first input buffer segment 3.1 or 4.1, and the second block 29.2 contains the addresses which refer to the second input buffer segment 3.2 or 4.2, and so forth.

The address storage blocks 30.1-30.4 contain the block numbers 1 to 4 of the address storage blocks 31.1-31.4, which address storage blocks with those numbers in their turn contain the addresses of the positions—in which the signals that have been switched through have to be put—in the output buffer segments in the output buffers 7 or 8, which output buffer segments correspond as to their numbering with the latter address storage blocks.

The positions in the address storage blocks of the two route stores 22 are numbered from 1 to 2000. In each route store the contents of the corresponding positions, so positions with the same number, form the data which instantaneously belong to one and the same time slot.

FIG. 8 once again shows the address storage blocks of the address stores 29, 30 and 31, in which, moreover, the possible contents of the time slot 831 are represented by way of example. The block numbers (2, 4, 3, 1), according to the sequence in which they occur in the address store 30 within this time slot, give a representation of a certain (4×4) permutation matrix, and in fact they designate the switching pattern appropriate to that time slot, when this set of address stores is used as an actual route store.

The address stores 29 and 30 directly correspond to the fields 12 and 14 in the tables of FIG. 4 for $\lambda=2000$ and $n=4$. The contents of address store 31, however, correspond to the contents of the fields 13 in the tables of FIG. 4, which contents are permuted according to the block numbers in address store 30.

Owing to the fact that the addressing of 2000 positions requires only 11 bits, the remaining 5 bits of each word can be used for block numbers in the address store 29, so that the address stores 29 and 30 can be combined for $n \leq 32$. Whether the address stores are combined or not, however, does not influence the nature of the invention; it has only slight consequences for software.

When during a mutation processing period no changes have occurred in the traffic interest, the two route stores will be identical as to their contents. If, on the other hand, changes have occurred, they have been introduced at a change-over to a next mutation processing period, into those address stores that are then going to form the actual route store, and the address stores in the other route store will become available for making modifications. First the modifications of the past period, the data of which are still retained in the working store 21, are also introduced into the route store 22, which has to be modified. Then the modifications will be introduced according to the signalling data received in the working store 21 during the current mutation processing period.

Said modification process is carried out according to the above-mentioned cases of changing connection interest:

re 1. A real signal connection is cleared. From the signalling data are derived the numbers of the address storage blocks in the address stores 29 and 31 and the addresses they contain, which addresses belong to said signal connection. The address of the signal in the corresponding input buffer segment is looked up in the address storage block of the address store 29. In the time slot in which said address occurs this address and the corresponding address of the signal destination, which is within the same time slot in the address storage block of address store 31, indicated in address store 30, are characterized as being free. The column number of the switching matrix in address store 30, which belongs to this pair of addresses, is not erased. The matrix element which is determined by the corresponding address storage block numbers and which is found in the pseudo-interest matrix Bp, which is recorded in the pseudo-interest store 23, however, is increased by 1.

re 2.1 A new signal connection has to be established. From the signalling data are derived the row and column number of the switching matrix point, for example i and j, and the signal addresses, for example $a_I$ and $a_O$, in the input buffer and output buffer segments, which addresses have to be recorded in the address storage blocks of the address stores 29 and 31, which address storage blocks are determined by the said numbers i and j. The element in the pseudo-interest matrix Bp in the store 23, which corresponds with (i, j) appears to be >0. This means that there is a time slot in which both the position in the address storage block i of the address store 29, and the position in the address storage block j of the address store 31 are free. This time slot is looked up and the addresses $a_I$ and $a_O$, respectively, are stored in the said positions. Finally the element (i, j) of the pseudo-interest matrix Bp in store 23 is decreased by 1.

re 2.2 A new signal connection has to be established. Once again row and column number i and j and the signal addresses $a_I$ and $a_O$ have been derived from the signalling data. Now the element (i, j) in the pseudo-interest matrix Bp turns out to be $=0$. In the ith address storage block of the address store 29 a search is made for a free position to which the reference to address storage block for example k($\neq$j) in the address store 31 belongs. This free position presents itself in, say, time slot $t_x$. In the jth address storage block of the address store 31 a search is made for a free position to which the reference to address storage block for example $1(\neq i)$ in the address store 29 belongs. This free position presents itself in, say, time slot $t_y$. The permutation of the column numbers in the time slots $t_x$ and $t_y$ are now compared with each other. By means of an exchange of these column numbers with the appurtenant (signal) addresses between the two time slots while maintaining their position in the permutations (row numbers), the free position in the one time slot is transferred to the other, so that after that the two free positions are for example in the time slot $t_x$. The column numbers are now given to these free positions in such a way that the one free position in the ith row can be reserved for the signal connection asked for, and that both the time slot $t_x$ and the time slot $t_y$ each again contain a complete permutation of the column numbers. In the pseudo-interest matrix Bp the elements (i,k) and (l,j), corresponding with the original free positions, are decreased by 1, and the element (l,k), corresponding with the new free position in time slot $t_x$, is increased by 1. In case the time slots $t_x$ and $t_y$ are the same, the free positions will already be in one time slot and will be acted accordingly.

When changing over to a new mutation processing period, the address stores modified just now will be disconnected from the busses 27 and 28 by the gate circuits 24. During the frame periods in this new mutation processing period these address stores will then be used as the route store proper for the switching-through of signals. For this purpose hardware-pointer mechanisms, which are known in themselves, have been provided, which mechanisms sequentially indicate, on receipt of each pulse from the central clock, in all the address storage blocks at the same time the address positions with the same number, i.e. the data belonging to one and the same time slot. Other hardware reading/writing mechanisms, which are also known, use said addresses for simultaneously indicating the corresponding signal positions in the input buffer 3 or 4, for simultaneously setting the switching points of the switching matrix 6, and for simultaneously switching through the signals indicated to the signal destinations simultaneously designated in the output buffer 7 or 8.

In case the switching network is used for switching speech paths, then a return path belongs to each go path. Independent of the go path this return path can be reserved in the way indicated. If, however, the external time slots for the return paths have been allotted symmetrically with regard to the go paths, the interest matrix too will become symmetric as to its construction, thus allowing the direct derivation of the necessary modifications in the route store for the return path from the route store for the go path. This will accelerate the modification process considerably.

I claim:

1. Method for controlling a switching network, which network comprises:
    A. an input buffer, consisting of a number of input buffer segments for storing incoming signals to be switched through;
    B. an output buffer, consisting of an equal number of output buffer segments for registering signals switched through;
    C. a switching matrix having rows and columns of crosspoints via which switching paths are formed between the input buffer and the output buffer; and
    D. a control device for periodically establishing switching paths, each of these switching paths being set up once in every one of a succession of equal frame periods each of which is divided into a number of internal time slots, in each of which a plurality of switching paths can be simultaneously provided by set-up as aforesaid, characterized in that the control device (5) performs a step of setting the switching matrix (6) during each internal time slot according to one of a number of fixed patterns of buffer segment interconnections, in such a way that in every internal time slot each of the rows is through-connected with a different column of the switching matrix.

2. Method in accordance with claim 1, wherein the step of setting the switching matrix comprises the following stages:
    deriving from the signalling data of a telecommunication signal an input address with an input number, which indicates the position in the input buffer segment with that input number, and an output address with an output number, which indicates the position in the output buffer segment with that output number;
    producing a connection interest matrix by calculation from the input and output numbers thus obtained;
    deriving a series of permutation matrices from said connection interest matrix, the sum of which comprises at least the interest matrix and thereby determining the switching patterns according to which the switching matrix has to be set, said permutation matrices being derived in such a way that the number of times a crosspoint of the switching matrix is directed to be used by said permutation matrices of said series amounts to at most the number of internal time slots in each frame period;
    registering the data for setting each of the switching patterns prescribed by said permutation matrices in one of a plurality of route stores (22);
    successively setting up switching paths according to each of the prescribed switching patterns under control by the said route store filled as aforesaid.

3. Method in accordance with claim 2 in which there are also performed the steps of:
    using one of said plurality of route stores as a route store for switching-through signals while another of said plurality of route stores is held available for modification of the switching patterns stored therein and has its stored switching patterns modified as the result of the provision of a new interest matrix by the operation of the method in response to new telecommunication signalling data and derivation of input and output addresses therefrom, there being derived from said signalling data not only said addresses but also designations of whether connection interest is to be incremented or decremented for the specified addresses, and
    interchanging the functions of the two aforesaid route stores by a switching operation performed periodically after successive intervals each of a whole number of frame periods.

4. Apparatus for controlling a switching network which network comprises:

A. an input buffer having a number of input buffer segments for storing time division multiplex incoming signals to be switched through the network;

B. an output buffer having a number of output buffer segments equal to the number of said input buffer segments, for registering signals switched through for further transmission;

C. a switching matrix having rows and columns of crosspoints via each of which a switching path may be formed between one of said input buffer segments and one of said output buffer segments, each buffer segment being connected either to a row or to a column of crosspoints according to whether the segment is an input or an output buffer segment, and D. control circuit means, including timing means for establishing a repetitive frame period and time slot subdivisions of said frame period, said control circuit means being constituted for providing said switching paths within the period of said time slots, in a manner capable of providing a plurality of said switching paths within the period of the same time slot, said apparatus further comprising:

means for deriving, from signalling data of signals switched or to be switched, buffer segment address numbers of the path that is switched or to be switched, and indication of whether a connection is to be terminated or established;

means for calculating, from said address numbers and indications derived from signalling data, a connection interest matrix for said switching network;

means for deriving a series of permutation matrices from said interest matrix, the sum of which matrices constitutes at least the equivalent of said interest matrix, the permutation matrices of said series being derived in such a way that the number of times a crosspoint defined by input and output addresses appears in said series does not exceed the number of internal time slots in each frame period;

means for storing permutation matrices of said series in a form suitable for defining respective switching paths to be set up in said matrix successive time slots of each frame; and means for setting up switching paths in said matrix in successive time slots of at least one frame in accordance with a pattern defined by the contents of said permutation matrix storage means.

5. Apparatus in accordance with claim 4, wherein:

the number of said internal time slots per frame is at least equal to the number of time-division multiplex signal stores in the buffer segment having the largest number of time-division multiplex signal stores;

said means for deriving said indications and address numbers include a signalling data store (17), and a microprocessor is provided for constituting processing circuits of said matrix calculating, deriving and storing means and of said path setting-up means.

6. Apparatus in accordance with claim 5 wherein:

said input and output buffers are provided in twin form;

buffer switching means are provided for periodically exchanging the functions of the two input buffers and the functions of the two output buffers, in such a way that the registering of signals in one of the input buffers, the reading out of signals registered in one of the output buffers and the switching through to the other output buffer of the signals registered in the other input buffer during the preceding frame period, can take place in parallel.

7. Apparatus in accordance with claim 5 wherein:

said means for storing permutation matrices is constituted of twin route stores (22);

route store switching means (24, 25,26) are provided to exchange the function of the two route stores after a whole number of frame periods at the beginning of a new frame period, and means are provided for using one of said route stores for switching signals through said network and simultaneously using the other of said route stores for making modifications in the permutation matrices stored therein conforming to new signalling data supplied to said address and indication deriving means and a new or modified interest matrix calculated by said calculating means.

8. Apparatus in accordance with claim 6 wherein:

said means for storing permutation matrices is constituted of twin route stores (22);

route store switching means (24, 25, 26) are provided to exchange the function of the two route stores after a whole number of frame periods at the beginning of a new frame period, and means are provided for using one of said route stores for switching signals through said network and simultaneously using the other of said route stores for making modifications in the permutation matrices stored therein conforming to new signalling data supplied to said address and indication deriving means and a new or modified interest matrix calculated by said calculating means.

* * * * *